(12) United States Patent
Cardona

(10) Patent No.: US 9,121,536 B2
(45) Date of Patent: Sep. 1, 2015

(54) HIGH-PRESSURE FLUID CONDUIT

(71) Applicant: Zena Associates, LLC, Folcroft, PA (US)

(72) Inventor: Robert Cardona, Cinnaminson, NJ (US)

(73) Assignee: Zena Associates, LLC, Folcroft, PA (US)

( * ) Notice: Subject to any disclaimer, the term of this patent is extended or adjusted under 35 U.S.C. 154(b) by 217 days.

(21) Appl. No.: 13/922,820

(22) Filed: Jun. 20, 2013

(65) Prior Publication Data

US 2014/0373945 A1    Dec. 25, 2014

(51) Int. Cl.
*F16L 37/30* (2006.01)
*F16K 17/36* (2006.01)
*F16L 55/10* (2006.01)

(52) U.S. Cl.
CPC ............. *F16L 37/30* (2013.01); *F16L 55/1007* (2013.01); *F16K 17/36* (2013.01); *F16L 55/1015* (2013.01); *F16L 55/1022* (2013.01); *Y10T 137/7723* (2015.04)

(58) Field of Classification Search
CPC ............. F16K 17/36; F16L 3/00; F16L 11/00; F16L 55/1007; F16L 55/1015; F16L 55/1022
USPC ............... 137/68.14, 456, 613, 614; 138/106, 138/109, 118.1, 155; 285/1
See application file for complete search history.

(56) References Cited

U.S. PATENT DOCUMENTS

| | | | |
|---|---|---|---|
| 1,304,364 A | 5/1919 | Phillips et al. | |
| 2,054,561 A | 9/1936 | Greenberg | |
| 2,165,640 A | 7/1939 | Marx | |
| 3,273,578 A | 9/1966 | Clark | |
| 3,630,214 A | 12/1971 | Levering | |
| 3,802,456 A | 4/1974 | Wittgenstein | |
| 3,859,692 A | 1/1975 | Waterman | |
| 3,907,336 A | 9/1975 | Siegmund | |
| 3,910,312 A | * 10/1975 | Weinhold | 137/614.03 |

(Continued)

FOREIGN PATENT DOCUMENTS

| GB | 2342709 A | 4/2000 |
|---|---|---|
| WO | 2011109664 A1 | 9/2011 |

OTHER PUBLICATIONS

PCT Notification of Transmittal, International Search Report and The Written Opinion of the International Searching Authority, International Application No. PCT/US2014/043364, dated Jan. 8, 2015, 10 pages.

(Continued)

*Primary Examiner* — Craig Schneider
*Assistant Examiner* — Daniel Donegan
(74) *Attorney, Agent, or Firm* — Barley Snyder

(57) ABSTRACT

A high-pressure fluid conduit that conducts high-pressure fluid from a high-pressure fluid source to a high-pressure fluid container through a hose unit during open or normal operation. This high-pressure fluid conduit has a safety feature that is activated when the high-pressure fluid conduit fails due to exposure to a predetermined force. The safety feature closes off the flow of high-pressure fluid from the high-pressure fluid source and closes off the escape of high-pressure fluid from the hose unit that entered the hose unit during open or normal operation. In addition, when the hose unit fails, fluid flow from the high-pressure fluid source and high-pressure fluid flow from the high-pressure fluid container is prevented.

16 Claims, 11 Drawing Sheets

(56) References Cited

U.S. PATENT DOCUMENTS

| | | | |
|---|---|---|---|
| 3,913,603 A | 10/1975 | Torres | |
| 4,023,584 A | 5/1977 | Rogers et al. | |
| 4,098,438 A | 7/1978 | Taylor | |
| 4,351,351 A | 9/1982 | Flory et al. | |
| 4,509,558 A | 4/1985 | Slater | |
| 4,614,201 A * | 9/1986 | King et al. | 137/68.15 |
| 4,735,083 A | 4/1988 | Tenenbaum | |
| 4,827,977 A * | 5/1989 | Fink, Jr. | 137/614.04 |
| 4,828,183 A | 5/1989 | Fink, Jr. | |
| 4,886,087 A | 12/1989 | Kitchen | |
| 4,896,688 A * | 1/1990 | Richards et al. | 137/68.15 |
| 4,921,000 A * | 5/1990 | King et al. | 137/68.14 |
| 5,054,523 A | 10/1991 | Rink | |
| 5,099,870 A | 3/1992 | Moore et al. | |
| 5,172,730 A | 12/1992 | Driver | |
| 5,250,041 A | 10/1993 | Folden et al. | |
| 5,343,738 A | 9/1994 | Skaggs | |
| 5,357,998 A | 10/1994 | Abrams | |
| 5,427,155 A | 6/1995 | Williams | |
| 5,497,809 A | 3/1996 | Wolf | |
| 5,518,034 A | 5/1996 | Ragout et al. | |
| 5,531,357 A | 7/1996 | Guilmette | |
| 5,551,484 A | 9/1996 | Charboneau | |
| 5,654,499 A | 8/1997 | Manuli | |
| 5,714,681 A | 2/1998 | Furness et al. | |
| 5,765,587 A | 6/1998 | Osborne | |
| 5,803,127 A | 9/1998 | Rains | |
| 5,868,170 A | 2/1999 | Spengler | |
| 5,931,184 A | 8/1999 | Armenia et al. | |
| 6,260,569 B1 * | 7/2001 | Abrams | 137/68.14 |
| 6,349,736 B1 * | 2/2002 | Dunmire | 137/15.19 |
| 6,546,947 B2 * | 4/2003 | Abrams | 137/68.14 |
| 6,899,131 B1 * | 5/2005 | Carmack et al. | 137/614.04 |
| 7,252,112 B1 * | 8/2007 | Imler et al. | 137/614.04 |
| 7,264,014 B2 * | 9/2007 | Boyd | 137/68.14 |
| 7,287,544 B2 * | 10/2007 | Seneviratne et al. | 137/375 |
| 8,336,570 B2 * | 12/2012 | Cardona | 137/68.14 |
| 8,800,586 B2 * | 8/2014 | Abrams | 137/68.14 |
| 2002/0007847 A1 * | 1/2002 | Abrams | 137/68.14 |
| 2003/0188799 A1 | 10/2003 | Cessac et al. | |
| 2005/0061366 A1 * | 3/2005 | Rademacher | 137/68.14 |
| 2005/0263193 A1 * | 12/2005 | Carmack et al. | 137/614.04 |
| 2008/0035222 A1 * | 2/2008 | Fraser | 137/614.04 |
| 2010/0276008 A1 | 11/2010 | Abrams | |
| 2013/0048110 A1 * | 2/2013 | Wolff | 137/512 |

OTHER PUBLICATIONS

Website for HPF, Inc., Breakaway Couplings, www.hpflap.com, HPF, Inc., 13450 Indian Creek, Cleveland, Ohio 44130, Tel: 440-816-2195, 1-800-445-1289, Fax: 440-816-2196, 2 pages, Copyright 2006.

Advertisement, Smalley Wave Springs, www.tfc.eu.com, 4 pages, Copyright 2008-2011.

Website, CSE IPG, Safety Breakaway Coupling, www.cse-ipg.com, 2 pages, Copyright 2000-2010.

* cited by examiner

HIGH-PRESSURE FLUID CONDUIT

FIELD OF THE INVENTION

The present invention relates, in general, to high-pressure fluid delivery and, in particular, to a high-pressure fluid conduit having a safety feature that provides protection against errors by a workman conducting the fluid delivery operation or a failure of the conduit during the fluid delivery operation.

BACKGROUND

When filling containers (e.g., cylinders, tank trucks, rail cars, and stationary tanks) with compressed or non-compressed fluids, both gasses and liquids, or operating equipment that relies on pressurized fluid flow, the fluid is transferred from one container (e.g., a tank truck) to another container (e.g., a stationary tank). Although the fluid can be transferred from one container to another via solid piping, it is common practice in many situations to use a flexible conduit or hose that connects the two containers and through which the fluid is transferred. A flexible hose allows ease of connection/disconnection between the containers, as well as a limited range of motion between the source of the fluid and the destination of the fluid.

For example, compressed or non-compressed gasses, such as oxygen, nitrogen, and carbon dioxide, and liquids, such as chemicals, petroleum and acids, are transported, stored, and used in individual containers of varying size and capacity. In order to fill these containers with the desired product, each container is connected, either singly or in groups, to a fluid filler/seller. In order to connect each container to the filling connection, a flexible hose is used to allow for quick connection/disconnection of the containers to and from the filling connection. A filling station manifold is one example of a filling connection. In addition, operating equipment that runs or uses compressed fluids, such as a forklift or a hydraulic system, also benefits from the ease of use of flexible hoses.

There are various safety risks associated with transferring fluids from one container to another. Service personnel conducting fluid delivery operations might make human errors, such as driving a tank truck away after filling a container without disconnecting the hose from the tank truck and/or the filled container.

Hoses can fail even though they are generally made from durable, yet flexible, materials/constructions, such as treated and reinforced rubber, neoprene, nylon, stainless steel, and others. Hose failures, such as leaks, ruptures, splits, and cuts, can result, for example, from material deterioration of the hose or accidentally damaging the hose by operation of other equipment in the vicinity.

When a hose fails, regardless of the cause of the failure, substantial damage can result in a number of ways. First, if a hose is completely severed or split, both ends of the hose can whip around wildly under the forces of the compressed fluid that is released from the severed ends. In addition, if a container is not secured, the pressure of the fluid leaving the container can cause the container to move very rapidly in the opposite direction of the escaping fluid. Both of these situations can result in substantial risk of personal injury, as well as property damage. Furthermore, a hose failure will cause leaks from both the delivery and receiving ends, leading to a costly waste of the fluid, as well as the discharge of a hazardous fluid, that has the potential of filling the environment with hazardous fumes or explosive fumes. When the piping system fails, other related equipment, such as shut-off valves and other fluid controls, as well as safety systems, might be damaged, causing physical injury or loss of life and extensive property damage.

SUMMARY

In accordance with the present invention, a high-pressure fluid conduit, adapted for connection between a high-pressure fluid source and a high-pressure fluid container, includes a hose unit having a first end and a second end. A first housing, adapted for connection to a high-pressure fluid source, has a first fluid opening through which high-pressure fluid from the high-pressure fluid source enters the first housing, a second fluid opening through which high-pressure fluid from the high pressure fluid source leaves first housing, and a cavity between the first fluid opening in the first housing and the second fluid opening in first housing. This high-pressure fluid conduit also includes a second housing, abutting the first housing, having a first fluid opening aligned with the second fluid opening of the first housing and through which high-pressure fluid leaving the first housing enters the second housing and a second fluid opening through which high-pressure fluid from the high-pressure fluid source entering the second housing leaves the second housing and enters the hose unit and high-pressure fluid from the hose unit enters the second housing upon separation of the first housing and the second housing. The second housing also has a cavity between the first fluid opening in the second housing and the second fluid opening in the second housing. A high-pressure fluid conduit, constructed in accordance with the present invention, further includes a third housing, adapted for connection to a high-pressure fluid container, having a first fluid opening through which high-pressure fluid from the high-pressure fluid source leaves the hose unit and enters the third housing and high-pressure fluid from the high-pressure fluid container tends to leave the third housing and enter the hose unit during a failure of hose unit, The third housing also has a second fluid opening through which high-pressure fluid from the high-pressure fluid source leaves the third housing and enters the high-pressure fluid container and high-pressure fluid from the high-pressure fluid container tends to enter the hose unit during a failure of the hose unit. The third housing also has a cavity between the first fluid opening in the third housing and the second fluid opening in the third housing. A high-pressure fluid conduit, constructed in accordance with the present invention, further includes a coupling for coupling the first housing to the second housing and sensing separation of the first housing and the second housing. This coupling has a weakened break-away section that fractures when a predetermined force is applied to the coupling that causes parts of the coupling to separate and permits separation of the first housing and the second housing. A high-pressure fluid conduit, constructed in accordance with the present invention, further includes a valve seat at the second fluid opening in the first housing, a valve seat at the first fluid opening in the second housing, and a valve seat at the first fluid opening in the third housing. A high-pressure fluid conduit, constructed in accordance with the present invention, further includes a first valve body mounted in the cavity of the first housing and movable between a first position to permit the flow of the high-pressure fluid from the high-pressure fluid source through first housing and a second position against the valve seat in the first housing to prevent high-pressure fluid leaving first housing. A high-pressure fluid conduit, constructed in accordance with the present invention, further includes a second valve body mounted in the cavity of the second housing and movable between a first position to permit the flow of the high-pressure fluid from the high-pressure fluid source through the second housing and a second position against the valve seat in the second housing to prevent the flow of high-pressure fluid from the hose unit leaving the second housing. A high-pressure fluid conduit, constructed in accordance with the present invention, further includes a third valve body mounted in the cavity of the third housing and movable between a first position to permit the flow of the high-pressure fluid from the high-pressure fluid source through the third housing and a second position against the valve seat in the third housing to prevent the flow of high-pressure fluid from the high-pressure fluid container leaving the third housing. A high-pressure fluid conduit, constructed in accordance with the present invention, further includes first valve control means for retaining the first valve body in its first position and the second valve body in its first position and selectively moving the first valve body towards its second position and the second valve body towards it second position in response to fracture of the coupling and separation of the parts of the coupling. A high-pressure fluid conduit, constructed in accordance with the present invention, further includes second valve control means for selectively moving the first valve body towards its second position and the third valve body towards its second position in response to a failure of the hose unit.

DETAILED DESCRIPTION OF THE EMBODIMENT

Figure 1:
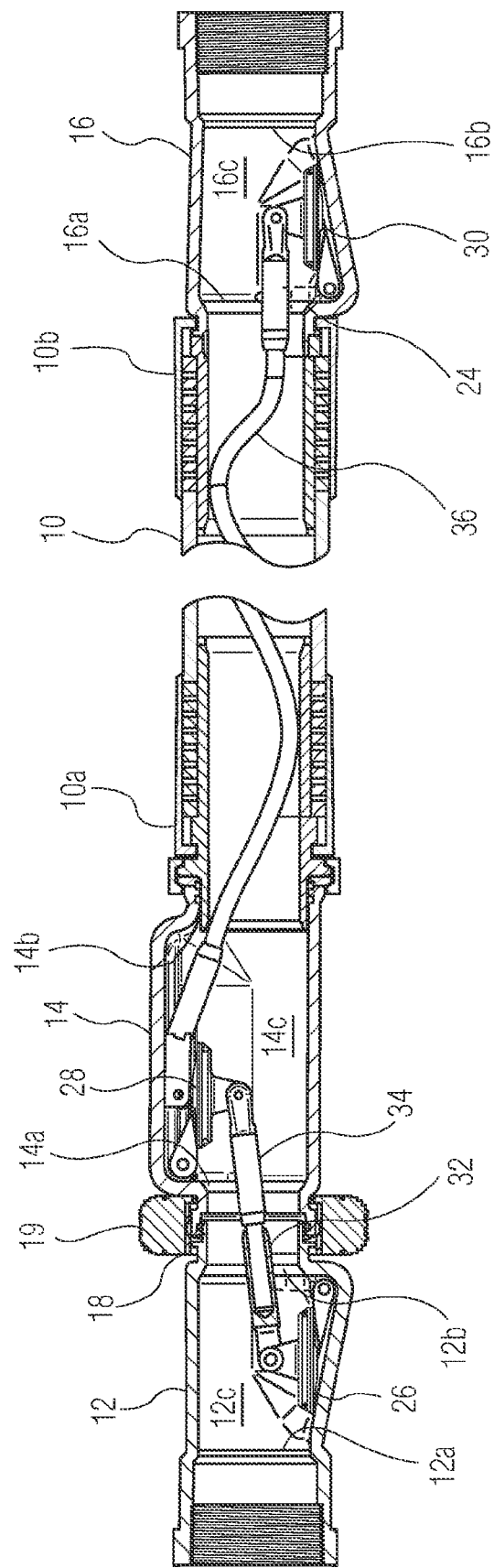
FIG. 1 is a cross-sectional view of a high-pressure fluid conduit constructed in accordance with the present invention and illustrates the condition of the high-pressure fluid conduit during open or normal operation.
Figure 2:
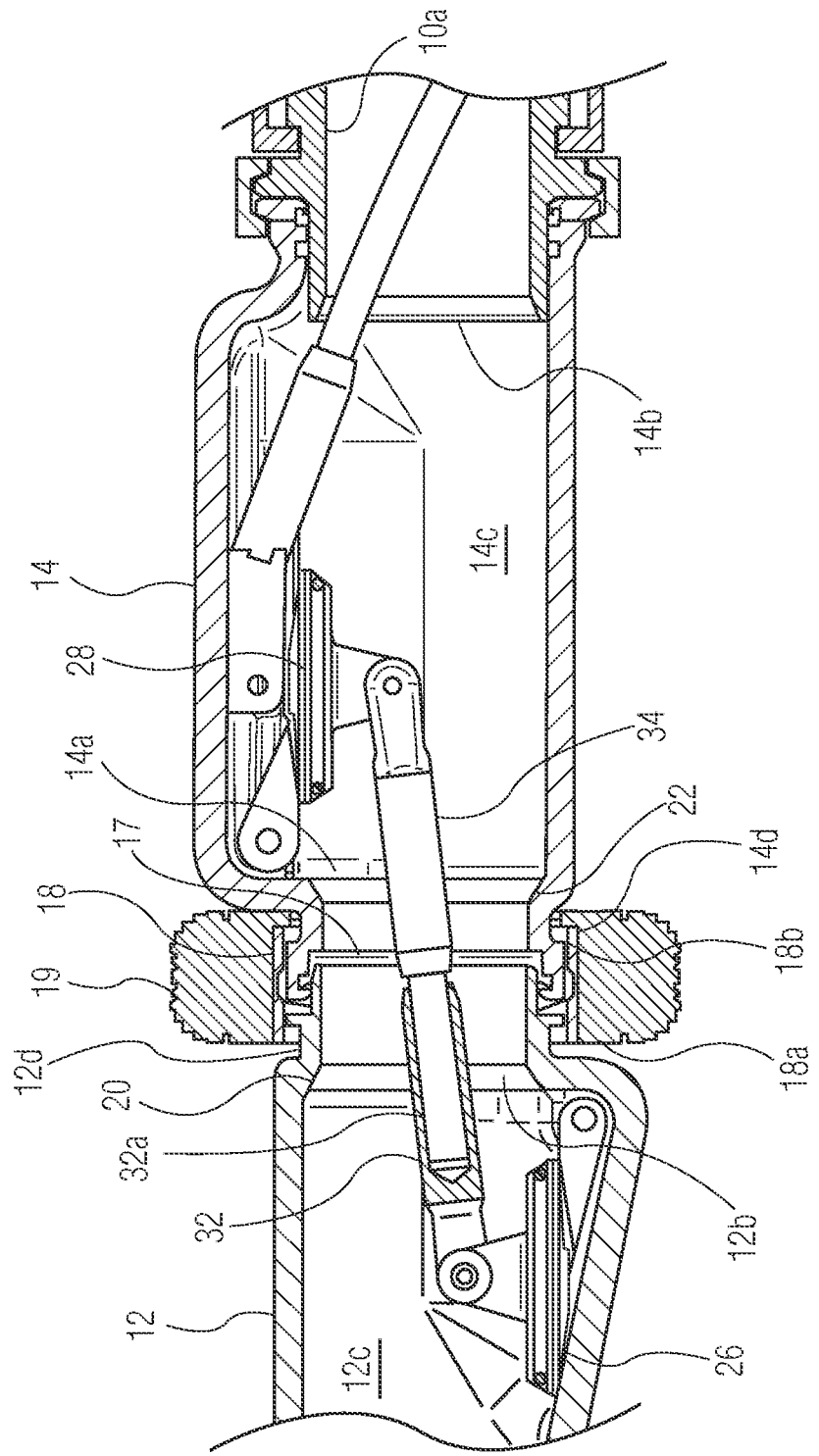
FIG. 2 is a cross-sectional view, on an enlarged scale, of a portion of the FIG. 1 high-pressure fluid conduit.

Referring to FIGS. 1 and 2, a high-pressure fluid conduit, constructed in accordance with the present invention, includes a hose unit 10 having a first end 10a and a second end 10b. End 10a of hose unit 10 receives high-pressure fluid from a high-pressure fluid source (not shown) and the high-pressure fluid leaves the hose unit and is delivered to a high-pressure fluid container (not shown) through end 10b of the hose unit. The high-pressure fluid source can be, for example, a tank truck and the high-pressure fluid container can be, for example, a storage tank.

A high-pressure fluid conduit, constructed in accordance with the present invention, also includes a first housing 12 adapted for connection to the high-pressure fluid source. Housing 12 has a first fluid opening 12a through which high-pressure fluid from the high-pressure fluid source enters housing 12, a second fluid opening 12b through which high-pressure fluid from the high pressure fluid source leaves housing 12, and a cavity 12c between first fluid opening 12a in housing 12 and second fluid opening 12b in housing 12.

A high-pressure fluid conduit, constructed in accordance with the present invention, further includes a second housing 14 abutting housing 12. Housing 14 has a first fluid opening 14a aligned with second fluid opening 12b of housing 12 and through which high-pressure fluid leaving housing 12 enters housing 14. Housing 14 also has a second fluid opening 14b through which high-pressure fluid from the high-pressure fluid source entering housing 14 leaves housing 14 and enters hose unit 10 and high-pressure fluid from the hose unit enters housing 14 upon separation of housing 12 and housing 14, as might occur, for example, when a tank truck is driven away before being disconnected from a storage container. Housing 14 also has a cavity 14c between first fluid opening 14a in housing 14 and second fluid opening 14b in housing 14.

A high-pressure fluid conduit, constructed in accordance with the present invention, further includes a third housing 16 adapted for connection to a high-pressure fluid container. Housing 16 has a first fluid opening 16a through which high-pressure fluid from the high-pressure fluid source leaves hose unit 10 and enters housing 16 and high-pressure fluid from the high-pressure fluid container tends to leave housing 16 and enter hose unit 10 during a failure of the hose unit. Housing 16 also has a second fluid opening 16b through which high-pressure fluid from the high-pressure fluid source leaves housing 16 and enters the high-pressure fluid container and high-pressure fluid from the high-pressure fluid container tends to enter hose unit 10 during a failure of hose unit. Third housing 16 also has a cavity 16c between first fluid opening 16a in housing 16 and second fluid opening 16b in housing 16.

Preferably a sealant 17, such as an o-ring, a gasket or a configuration of tightly fitting surfaces, appropriate for the fluid being transferred, is provided at or on the abutting surfaces of housings 12 and 14 for the purpose containing the fluid within the high-pressure fluid conduit during open or normal operation. This sealant permits the abutting surfaces of housings 12 and 14 to separate freely after a break-away event as described below.

A high-pressure fluid conduit, constructed in accordance with the present invention, further includes a coupling 18 for coupling first housing 12 to second housing 14 and sensing separation of housing 12 and housing 14. In particular, coupling 18 is fitted in a notch 12d in housing 12 and a notch 14d in housing 14.

Figure 11:
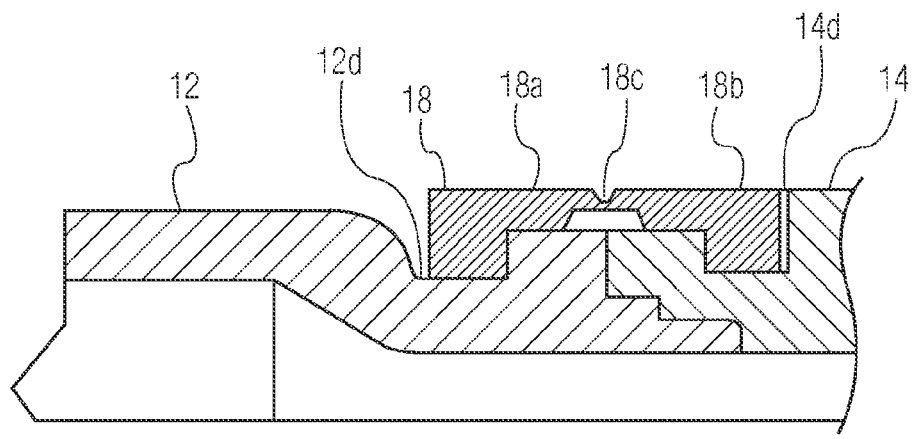
FIG. 11 is a cross-sectional view of the coupling portion of a high-pressure fluid conduit, constructed in accordance with the present invention, and illustrates the condition of the high-pressure fluid conduit during open or normal operation.
Figure 12:
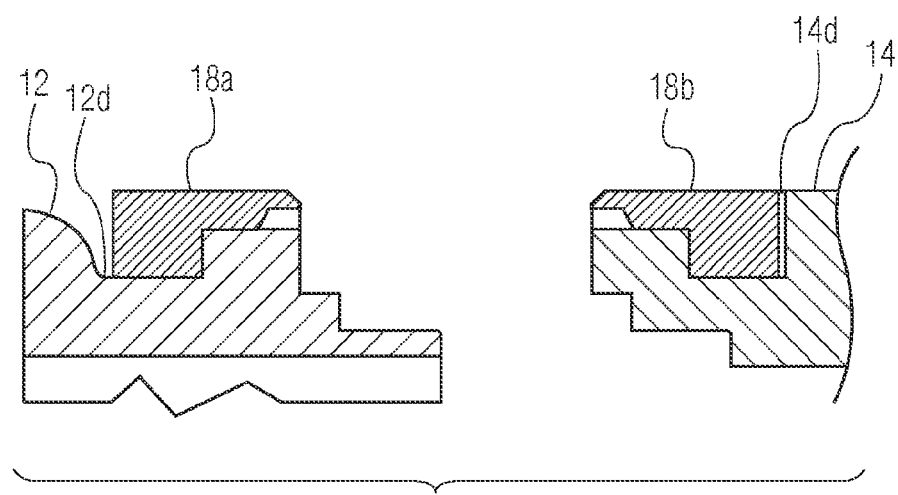
FIG. 12 is a cross-sectional view of the coupling portion of a high-pressure fluid conduit, constructed in accordance with the present invention, and illustrates the condition of the high-pressure fluid conduit after a break-away event.

As shown most clearly in FIG. 11, coupling 18 has a weakened break-away section that fractures when a predetermined force is applied to the coupling and serves as a break-away component with parts 18a and 18b that separate thereby permitting, as shown most clearly in FIG. 12, separation of first housing 12 and second housing 14 when, for example, the driver of a tank truck fails to disconnect the high-pressure fluid conduit from either the tank truck or a storage container before driving the tank truck away from the storage container. Upon fracture of coupling 18, a safety feature is activated and the high-pressure fluid conduit switches from an open or normal mode of operation to a closed or safety-activated mode of operation.

Figure 3:
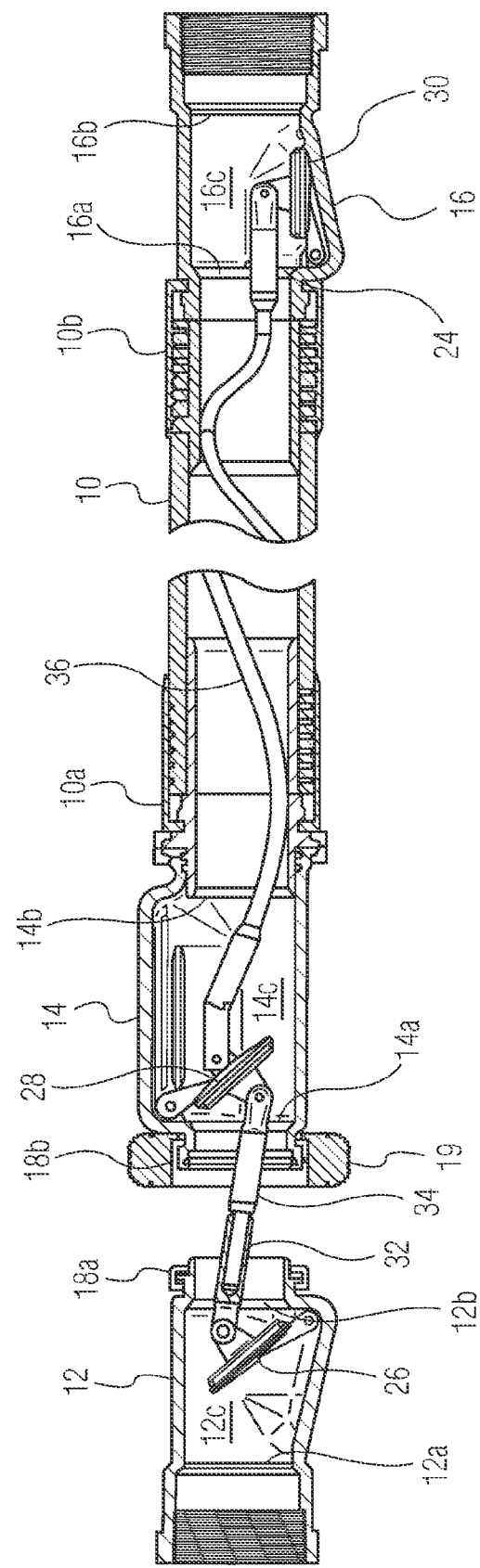
FIG. 3 is a cross-sectional view of a high-pressure fluid conduit constructed in accordance with the present invention and illustrates the condition of the high-pressure fluid conduit in transition after a break-away event from an open or normal condition to a closed position.
Figure 4:
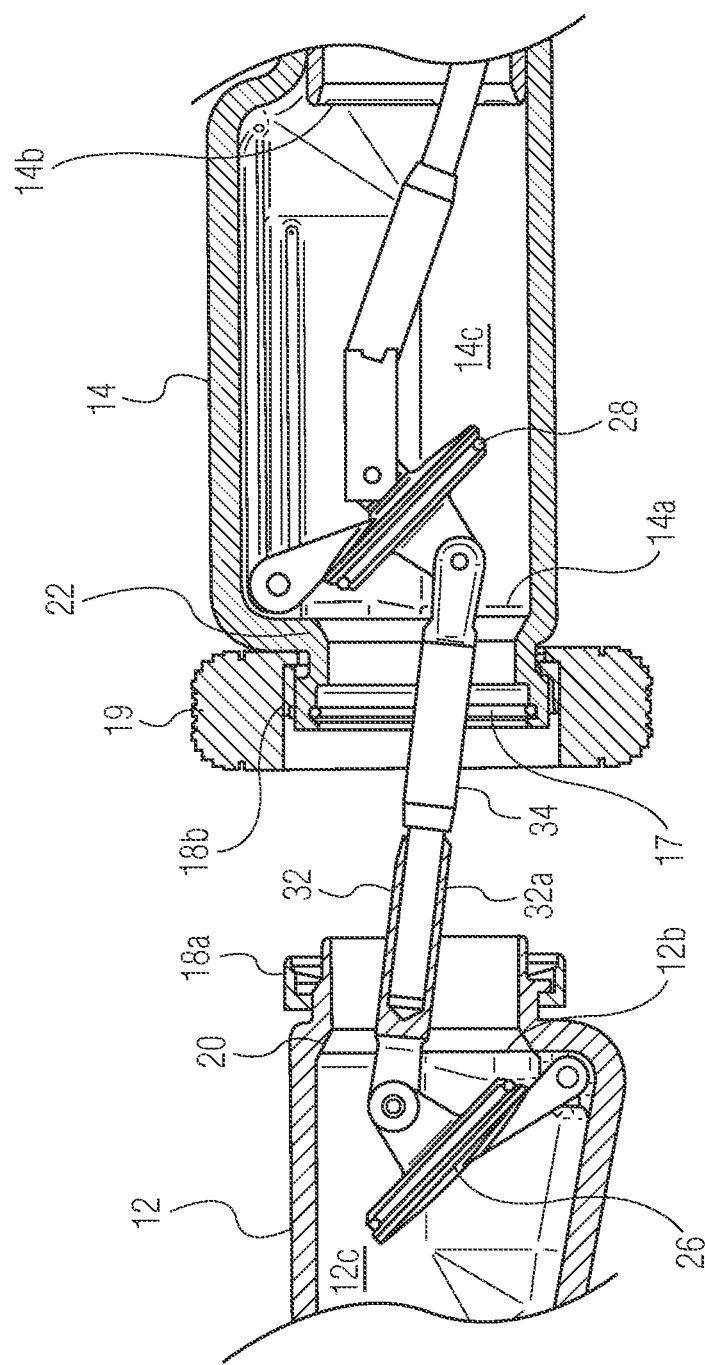
FIG. 4 is a cross-sectional view, on an enlarged scale, of a portion of the FIG. 3 high-pressure fluid conduit.
Figure 5:
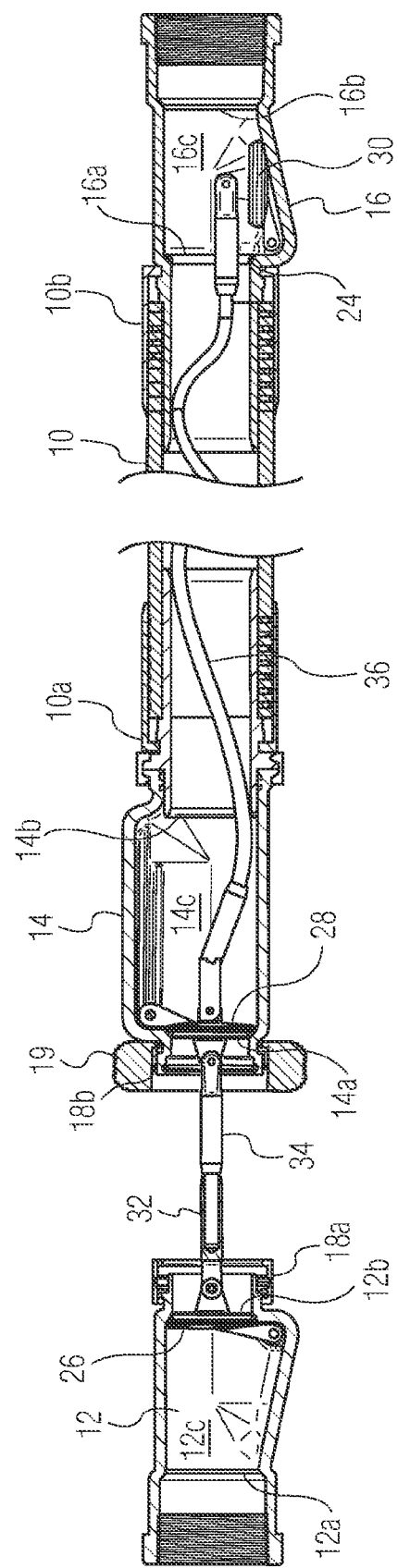
FIG. 5 is a cross-sectional view of a high-pressure fluid conduit constructed in accordance with the present invention and illustrates the condition of the high-pressure fluid conduit in closed position after a break-away event.
Figure 6:
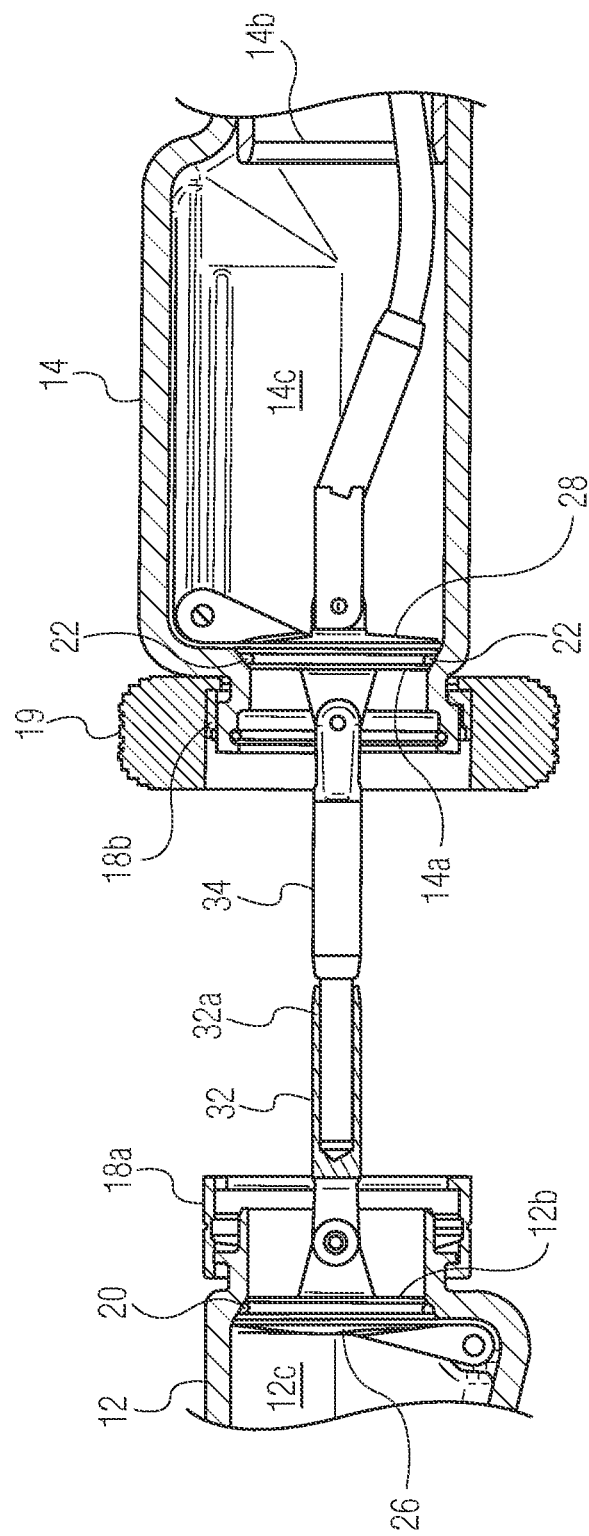
FIG. 6 is a cross-sectional view, on an enlarged scale, of a portion of the FIG. 5 high-pressure fluid conduit.
Figure 7:
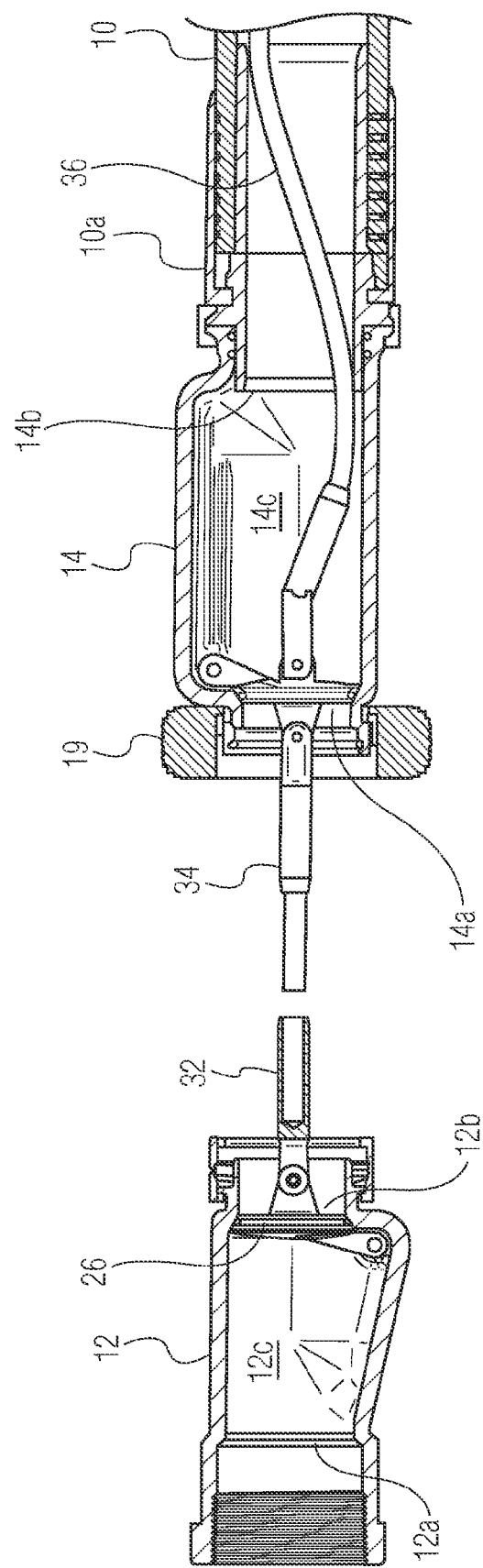
FIG. 7 is a cross-sectional view of a high-pressure fluid conduit constructed in accordance with the present invention and illustrates the condition of the high-pressure fluid conduit after a break-away event and after complete separation of parts of the high-pressure fluid conduit.
Figure 8:
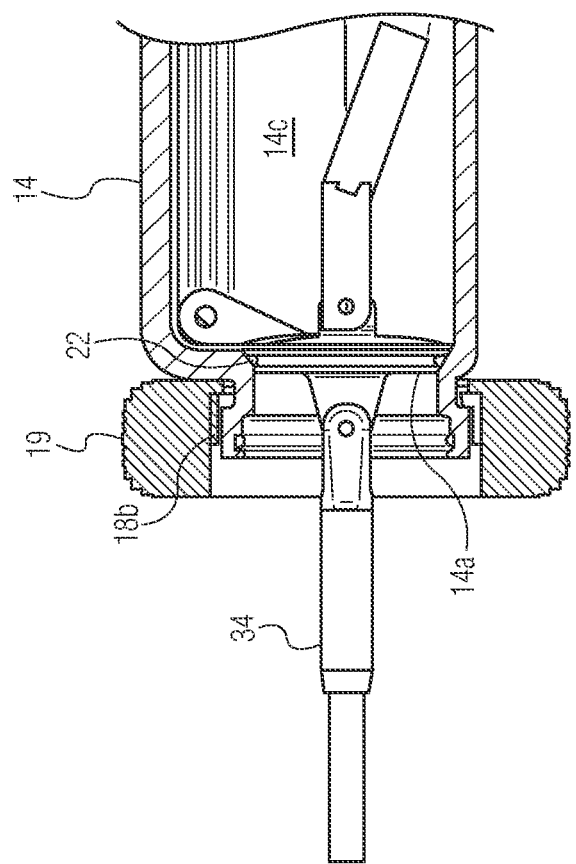
FIG. 8 is a cross-sectional view, on an enlarged scale, of a portion of the FIG. 7 high-pressure fluid conduit
Figure 8:
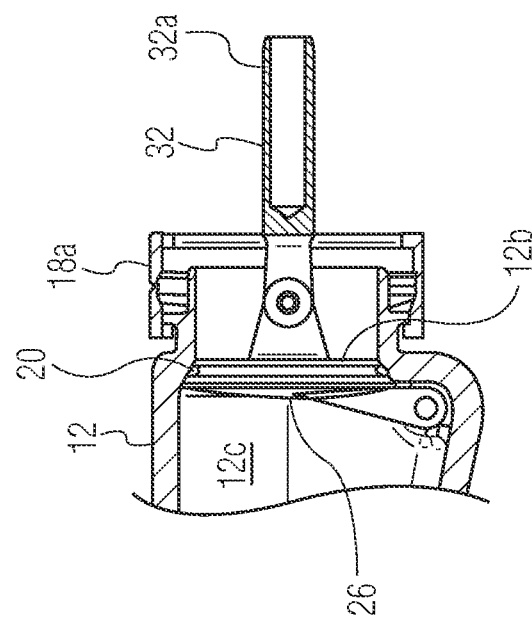

A transition from the open or normal mode of operation to a closed or safety-activated mode of operation is illustrated in FIGS. 3 and 4. FIGS. 5 and 6 illustrate the high-pressure fluid conduit in closed position after a break-away event with first housing 12 and second housing 14 separated but not completely disconnected. FIGS. 7 and 8 illustrate the high-pressure fluid conduit after a break-away event and after complete separation and disconnection of first housing 12 and second housing 14. The change in condition from an open or normal mode of operation to a closed or safety-activated mode of operation is further described below.

For the embodiment of the present invention that is illustrated, coupling 18 is an annular ring having a weakened section extending around the annular ring that fractures when a predetermined force is applied to the annular ring that causes first and second parts 18a and 18b of the annular ring, on opposite sides of the weakened section, to separate. The weakened section of annular ring 18, in the form of a continuous groove 18c that extends circumferentially completely around the annular ring, has a reduced thickness, relative to the thickness of first and second parts 18a and 18b of the annular ring. The size, shape, and extent of groove 18c calibrate annular ring 18 to fracture when a predetermined force is applied to the annular ring, whereupon first and second parts 18a and 18b of the annular ring separate as illustrated most clearly in FIG. 12. It should be noted that this force, when applied generally along the longitudinal axis of the high-pressure fluid conduit will result in substantially uniform separation of first and second parts 18a and 18b of annular ring 18 along groove 18c, while a force applied at an angle to the longitudinal axis of the high-pressure fluid conduit will result in progressive separation of first and second parts 18a and 18b of the annular ring along groove 18c. For more details about annular ring 18 and the manner in which it functions to couple two parts together and permits the two parts to separate when a predetermined force is applied to the annular ring, reference should be made to U.S. Pat. No. 8,336,570.

To protect against a premature fracture of coupling 18, as might occur when an end of the high-pressure fluid conduit is dropped accidentally, a high-pressure fluid conduit, constructed in accordance with the present invention, preferably includes a shock absorber that protects coupling 18. This shock absorber can be a compressible ring 19 that completely surrounds annular ring 18 and takes up or absorbs the energy that might cause coupling 18 to fracture prematurely.

A high-pressure fluid conduit, constructed in accordance with the present invention, further includes a valve seat 20 at second fluid opening 12b in first housing 12, a valve seat 22 at first fluid opening 14a in second housing 14, and a third valve seat 24 at first fluid opening 16a in third housing 16.

A high-pressure fluid conduit, constructed in accordance with the present invention, further includes a first valve body 26 that is pivotally mounted in cavity 12c of first housing 12 and is movable between a first position to permit the flow of the high-pressure fluid from the high-pressure fluid source through housing 12, as shown in FIGS. 1 and 2, and a second position against valve seat 20 in housing 12 to prevent high-pressure fluid leaving housing 12, as shown in FIGS. 5 through 10. For the embodiment of the present invention illustrated, first valve body 26 is mounted for pivotal movement from its first position to its second position.

A high-pressure fluid conduit, constructed in accordance with the present invention, further includes a second valve body 28 that is pivotally mounted in cavity 14c of second housing 14 and is movable between a first position to permit the flow of the high-pressure fluid from the high-pressure fluid source through housing 14, as shown in FIGS. 1 and 2, and a second position against valve seat 22 in housing 14 to prevent the flow of high-pressure fluid from hose unit 10 leaving second housing 14, as shown in FIGS. 5 through 8. For the embodiment of the present invention illustrated, second valve body 28 is mounted for pivotal movement from its first position to its second position.

Figure 9:
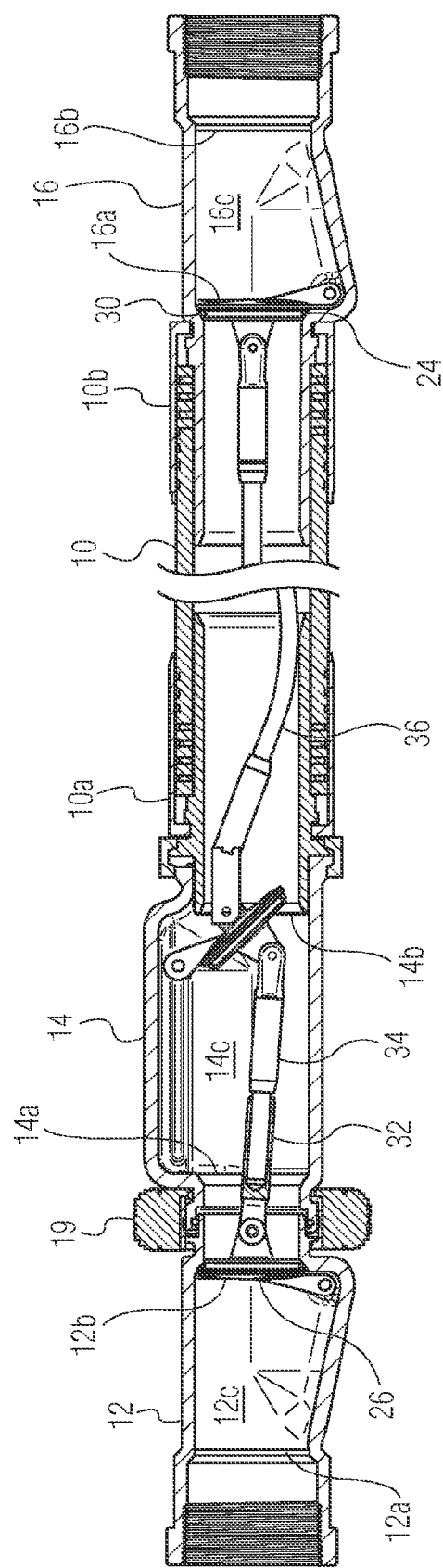
FIG. 9 is a cross-sectional view of a high-pressure fluid conduit constructed in accordance with the present invention and illustrates the condition of the high-pressure fluid conduit after a hose failure or an unintended separation of the hose from other components of the high-pressure fluid conduit.
Figure 10:
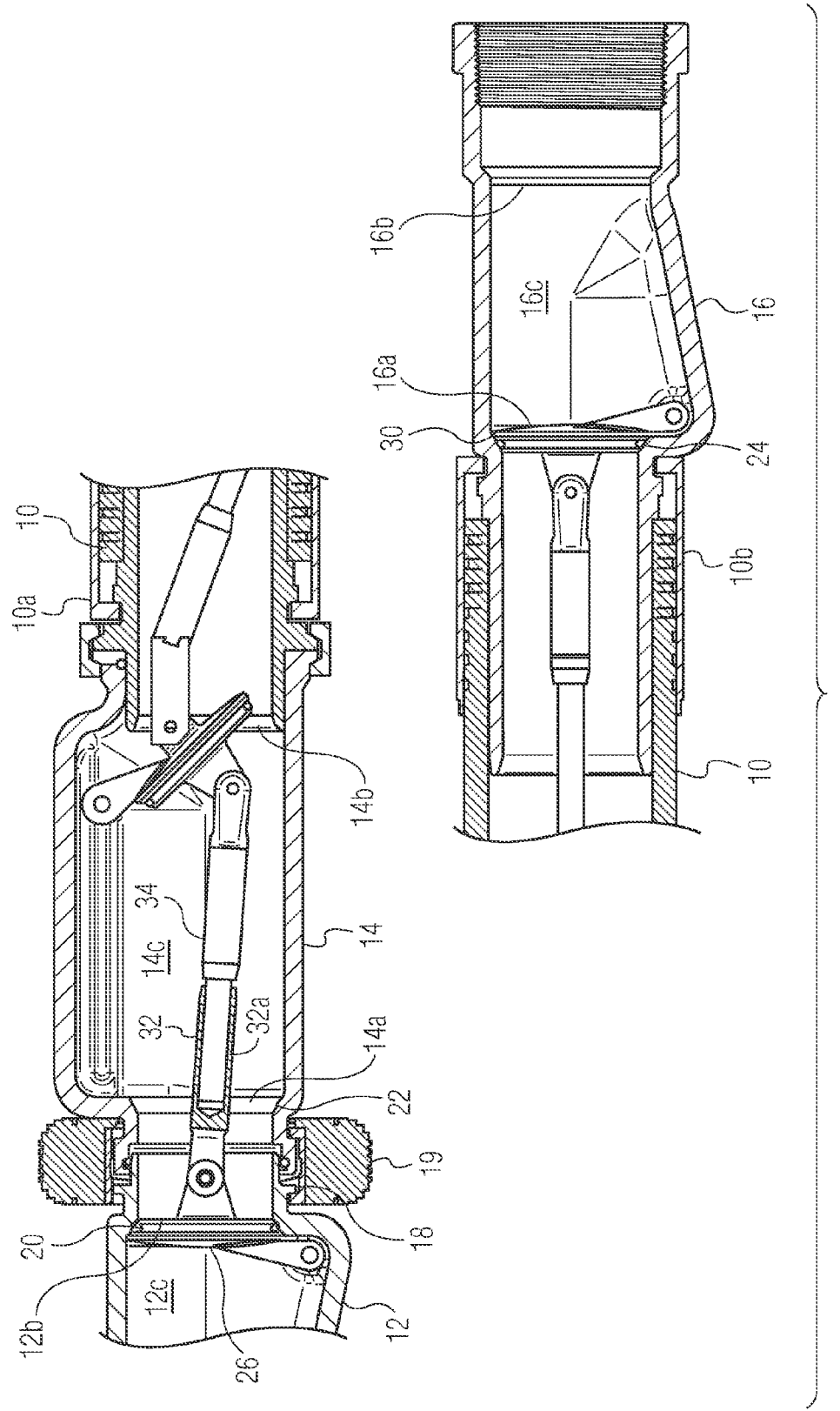
FIG. 10 is a cross-sectional view, on an enlarged scale, of a portion of the FIG. 9 high-pressure fluid conduit

A high-pressure fluid conduit, constructed in accordance with the present invention, further includes a third valve body 30 that is mounted in cavity 16c of third housing 16 and is movable between a first position to permit the flow of the high-pressure fluid from the high-pressure fluid source through housing 16, as shown in FIGS. 1 and 2, and a second position against valve seat 24 in housing 16 to prevent the flow of high-pressure fluid from the high-pressure fluid container leaving housing 16, as shown in FIGS. 9 and 10. For the embodiment of the present invention illustrated, third valve body 30 is mounted for pivotal movement from its first position to its second position.

A high-pressure fluid conduit, constructed in accordance with the present invention, further includes first valve control means for retaining first valve body 26 in its first position and second valve body 28 in its first position and selectively moving first valve body 26 towards its second position and second valve body 28 towards its second position in response to fracture of coupling 18 and separation of parts 18a and 18b of coupling 18. For the embodiment of the present invention illustrated, the first valve control means include a linkage having a first member 32 pivotally secured to first valve body 26 and a second member 34 pivotally secured to second valve body 28 and coupled to and separable from first member 32 of the linkage. Specifically, first member 32 of the linkage and second member 34 of linkage are coupled together by one of the members of the linkage (34 as illustrated) fitted into a bore hole 32a in the other of the members of linkage (32 as illustrated). During open or normal operation, as illustrated in FIGS. 1 and 2, linkage members 32 and 34 are coupled together with linkage member 34 fitted in bore hole 32a of linkage member 32. This fit between linkage members 32 and 34 is such that, upon separation of housings 12 and 14, as illustrated in FIGS. 3 and 4, linkage member 34 can begin to withdraw from linkage member 32 and valve bodies 26 and 28 are permitted to move from their first positions out of the flow of high-pressure fluid through housing 12 and 14, respectively, toward their second positions. The flow of high-pressure fluid through housing 12 from the high-pressure fluid source urges valve body 26 to its second position, namely against valve seat 22, thereby preventing the escape of high-pressure fluid from the high-pressure fluid source from housing 12. The flow of high-pressure fluid through housing 14 from hose unit 10 urges valve body 28 to its second position, namely against valve seat 24, thereby preventing the escape of high-pressure fluid from hose unit 10. FIGS. 5 and 6 show valve bodies 26 and 28 fully seated. FIGS. 7 and 8 show valve bodies 26 and 28 fully seated even after complete separation and disconnection of housings 12 and 14 and linkage members 32 and 34.

To protect against high-pressure fluid flow from the high-pressure fluid source and high-pressure fluid flow from the high-pressure fluid container after a hose unit failure (represented by the jagged lines extending across hose unit 10 in FIG. 9) that can occur after a break-away event or in the absence of a break-away event, a high-pressure fluid conduit, constructed in accordance with the present invention, further includes second valve control means for retaining third valve body 30 in its first position and first valve body 26 in its first position and selectively moving third valve body 30 towards its second position and first valve body 26 towards its second position in response to a failure of hose unit 10. For the embodiment of the present invention illustrated, the second valve control means include a serpentine cable 36, in combination with second valve body 28 and linkage 34, connected between first valve body 26 and third valve body 30. Cable 36 is made from a flexible, yet relatively stiff, material capable of retaining valve body 30 in its first position, as shown in FIGS. 1, 3, and 5, so that high-pressure fluid from the high-pressure fluid source is permitted to flow to the high-pressure fluid container during open or normal delivery. A failure of hose unit 10 results in increased separation of second housing 14 and third housing 16 which, in turn, causes cable 36 to straighten and ultimately cause third valve body 30 to move to its second position, namely seated against valve seat 24 and first valve body 26 to move to its second position, namely seated against valve seat 20, as shown in FIGS. 9 and 10, so that first fluid opening 16a in housing 16 and the second fluid opening 12b in housing 12 are sealed to prevent high-pressure fluid flow from the high-pressure fluid container and the high-pressure fluid source after a failure of hose unit 10. With no separation between first housing 12 and second housing 14, the linkage between valve bodies 26 and 28 remains intact and rigid, so that the increasing separation between housing 14 and housing 16 as cable becomes taut is effectively a separation of housing 12 and housing 16 which causes valve body 26 in housing 12 to close and prevent the flow of high-pressure fluid from the high-pressure fluid source.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A high-pressure fluid conduit adapted for connection between a high-pressure fluid source and a high-pressure fluid container, said high-pressure fluid conduit comprising:
    a hose unit having a first end and a second end;
    a first housing adapted for connection to a high-pressure fluid source and having:
    (a) a first fluid opening through which high-pressure fluid from the high-pressure fluid source enters said first housing,
    (b) a second fluid opening through which high-pressure fluid from the high pressure fluid source leaves said first housing, and
    (c) a cavity between said first fluid opening in said first housing and said second fluid opening in said first housing;
    a second housing abutting said first housing and having:
    (a) a first fluid opening aligned with said second fluid opening of said first housing and through which high-pressure fluid leaving said first housing enters said second housing,
    (b) a second fluid opening through which:
        (1) high-pressure fluid from the high-pressure fluid source entering said second housing leaves said second housing and enters said hose unit, and
        (2) high-pressure fluid from the hose unit enters said second housing upon separation of said first housing and said second housing, and
    (c) a cavity between said first fluid opening in said second housing and said second fluid opening in said second housing;
    a third housing adapted for connection to a high-pressure fluid container and having:
    (a) a first fluid opening through which:
        (1) high-pressure fluid from the high-pressure fluid source leaves said hose unit and enters said third housing, and
        (2) high-pressure fluid from the high-pressure fluid container tends to leave said third housing and enter said hose unit during a failure of said hose unit,
    (b) a second fluid opening through which:
        (1) high-pressure fluid from the high-pressure fluid source leaves said third housing and enters the high-pressure fluid container, and
        (2) high-pressure fluid from the high-pressure fluid container tends to enter said hose unit during a failure of said hose unit, and
    (c) a cavity between said first fluid opening in said third housing and said second fluid opening in said third housing;
    a coupling:
    (a) for:
        (1) coupling said first housing to said second housing, and
        (2) sensing separation of said first housing and said second housing, and
    (b) having a weakened break-away section that:
        (1) fractures when a predetermined force is applied to said coupling that causes parts of said coupling to separate, and
        (2) permits separation of said first housing and said second housing;
    a valve seat at said second fluid opening in said first housing;
    a valve seat at said first fluid opening in said second housing;
    a valve seat at said first fluid opening in said third housing;
    a first valve body mounted in said cavity of said first housing and movable between:
    (a) a first position to permit the flow of the high-pressure fluid from the high-pressure fluid source through said first housing, and
    (b) a second position against said valve seat in said first housing to prevent high-pressure fluid leaving said first housing;
    a second valve body mounted in said cavity of said second housing and movable between:
    (a) a first position to permit the flow of the high-pressure fluid from the high-pressure fluid source through said second housing, and
    (b) a second position against said valve seat in said second housing to prevent the flow of high-pressure fluid from said hose unit leaving said second housing;

a third valve body mounted in said cavity of said third housing and movable between:
(a) a first position to permit the flow of the high-pressure fluid from the high-pressure fluid source through said third housing, and
(b) a second position against said valve seat in said third housing to prevent the flow of high-pressure fluid from the high-pressure fluid container leaving said third housing;
first valve control means for:
(a) retaining said first valve body in its first position and said second valve body in its first position, and
(b) selectively moving said first valve body towards its second position and said second valve body towards it second position in response to fracture of said coupling and separation of said parts of said coupling; and
second valve control means for selectively moving said first valve body towards its second position and said third valve body towards its second position in response to a failure of said hose unit.

2. A high-pressure fluid conduit according to claim 1 wherein said first valve control means include a linkage having:
(a) a first member pivotally secured to said first valve body, and
(b) a second member pivotally secured to said second valve body and coupled to and separable from said first member of said linkage.

3. A high-pressure fluid conduit according to claim 2 wherein said first member of said linkage and said second member of said linkage are coupled together by one of said members of said linkage fitted into a bore hole in the other of said members of said linkage.

4. A high-pressure fluid conduit according to claim 1 wherein said coupling is an annular ring having a weakened section extending around said annular ring that fractures when a predetermined force is applied to said annular ring that causes first and second parts of said annular ring on opposite sides of said weakened section to separate.

5. A high-pressure fluid conduit according to claim 4 wherein said weakened section of said annular ring has a reduced thickness, relative to the thickness of said first and second parts of said annular ring, that extends completely around said annular ring.

6. A high-pressure fluid conduit according to claim 5 wherein said weakened section of said annular ring is a continuous groove that extends circumferentially of said annular ring.

7. A high-pressure fluid conduit according to claim 4 further including a shock absorber surrounding said annular ring.

8. A high-pressure fluid conduit according to claim 1 wherein said second valve control means include:
(a) a serpentine cable connected between said second valve body and said third valve body,
(b) said second member of said linkage, and
(c) second valve body.

9. A high-pressure fluid conduit adapted for connection between a high-pressure fluid source and a high-pressure fluid container, said high-pressure fluid conduit comprising:
a hose unit having a first end and a second end;
a first housing adapted for connection to a high-pressure fluid source and having:
(a) a first fluid opening through which high-pressure fluid from the high-pressure fluid source enters said first housing,
(b) a second fluid opening through which high-pressure fluid from the high pressure fluid source leaves said first housing, and
(c) a cavity between said first fluid opening in said first housing and said second fluid opening in said first housing;
a second housing abutting said first housing and having:
(a) a first fluid opening aligned with said second fluid opening of said first housing and through which high-pressure fluid leaving said first housing enters said second housing,
(b) a second fluid opening through which:
(1) high-pressure fluid from the high-pressure fluid source entering said second housing leaves said second housing and enters said hose unit, and
(2) high-pressure fluid from the hose unit enters said second housing upon separation of said first housing and said second housing, and
(c) a cavity between said first fluid opening in said second housing and said second fluid opening in said second housing;
a third housing adapted for connection to a high-pressure fluid container and having:
(a) a first fluid opening through which:
(1) high-pressure fluid from the high-pressure fluid source leaves said hose unit and enters said third housing, and
(2) high-pressure fluid from the high-pressure fluid container tends to leave said third housing and enter said hose unit during a failure of said hose unit,
(b) a second fluid opening through which:
(1) high-pressure fluid from the high-pressure fluid source leaves said third housing and enters the high-pressure fluid container, and
(2) high-pressure fluid from the high-pressure fluid container tends to enter said hose unit during a failure of said hose unit, and
(c) a cavity between said first fluid opening in said third housing and said second fluid opening in said third housing;
a coupling:
(a) for:
(1) coupling said first housing to said second housing, and
(2) sensing separation of said first housing and said second housing, and
(b) having a weakened break-away section that:
(1) fractures when a predetermined force is applied to said coupling that causes parts of said coupling to separate, and
(2) permits separation of said first housing and said second housing;
a valve seat at said second fluid opening in said first housing;
a valve seat at said first fluid opening in said second housing;
a valve seat at said first fluid opening in said third housing;
a first valve body pivotally mounted in said cavity of said first housing and movable between:
(a) a first position to permit the flow of the high-pressure fluid from the high-pressure fluid source through said first housing, and
(b) a second position against said valve seat in said first housing to prevent high-pressure fluid leaving said first housing;
a second valve body pivotally mounted in said cavity of said second housing and movable between:

(a) a first position to permit the flow of the high-pressure fluid from the high-pressure fluid source through said second housing, and
(b) a second position against said valve seat in said second housing to prevent the flow of high-pressure fluid from said hose unit leaving said second housing;
a third valve body pivotally mounted in said cavity of said third housing and movable between:
(a) a first position to permit the flow of the high-pressure fluid from the high-pressure fluid source through said third housing, and
(b) a second position against said valve seat in said third housing to prevent the flow of high-pressure fluid from the high-pressure fluid container leaving said third housing;
first valve control means for:
(a) retaining said first valve body in its first position and said second valve body in its first position, and
(b) selectively moving said first valve body towards its second position and said second valve body towards it second position in response to fracture of said coupling and separation of said parts of said coupling; and
second valve control means for selectively moving said first valve body towards its second position and said third valve body towards its second position in response to a hose failure.

10. A high-pressure fluid conduit according to claim 9 wherein said coupling is an annular ring having a weakened section extending around said annular ring that fractures when a predetermined force is applied to said annular ring that causes first and second parts of said annular ring on opposite sides of said weakened section to separate.

11. A high-pressure fluid conduit according to claim 10 wherein said weakened section of said annular ring has a reduced thickness, relative to the thickness of said first and second parts of said annular ring, that extends completely around said annular ring.

12. A high-pressure fluid conduit according to claim 11 wherein said weakened section of said annular ring is a continuous groove that extends circumferentially of said annular ring.

13. A high-pressure fluid conduit according to claim 10 further including a shock absorber surrounding said annular ring.

14. A high-pressure fluid conduit according to claim 9 wherein said first valve control means include a linkage having:
(a) a first member pivotally secured to said first valve body, and
(b) a second member pivotally secured to said second valve body and coupled to and separable from said first member of said linkage.

15. A high-pressure fluid conduit according to claim 14 wherein said first member of said linkage and said second member of said linkage are coupled together by one of said members of said linkage fitted into a bore hole in the other of said members of said linkage.

16. A high-pressure fluid conduit according to claim 14 wherein said second valve control means include:
(a) a serpentine cable connected between said second valve body and said third valve body,
(b) said second member of said linkage, and
(c) second valve body.

\* \* \* \* \*